United States Patent
Lyle et al.

(10) Patent No.: US 7,568,010 B2
(45) Date of Patent: Jul. 28, 2009

(54) SELF-UPDATING EMAIL MESSAGE

(75) Inventors: Ruthie D. Lyle, Durham, NC (US); Fonda Daniels, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 617 days.

(21) Appl. No.: 11/280,742

(22) Filed: Nov. 16, 2005

(65) Prior Publication Data

US 2007/0112919 A1 May 17, 2007

(51) Int. Cl.
*G06F 15/16* (2006.01)
(52) U.S. Cl. .................. 709/206; 709/200; 709/204; 709/205; 719/310
(58) Field of Classification Search .................. 709/206
See application file for complete search history.

(56) References Cited

U.S. PATENT DOCUMENTS

| | | | | |
|---|---|---|---|---|
| 6,405,243 | B1 * | 6/2002 | Nielsen | 709/206 |
| 6,516,341 | B2 * | 2/2003 | Shaw et al. | 709/206 |
| 2001/0032232 | A1 * | 10/2001 | Zombek et al. | 709/201 |
| 2001/0047391 | A1 * | 11/2001 | Szutu | 709/206 |
| 2002/0052921 | A1 | 5/2002 | Morkel | |
| 2002/0091944 | A1 * | 7/2002 | Anderson et al. | 713/201 |
| 2002/0107931 | A1 * | 8/2002 | Singh et al. | 709/206 |
| 2002/0143812 | A1 | 10/2002 | Bedingfield | |
| 2003/0018726 | A1 * | 1/2003 | Low et al. | 709/206 |
| 2003/0023693 | A1 * | 1/2003 | Nakamura | 709/206 |
| 2003/0110097 | A1 * | 6/2003 | Lei | 705/27 |
| 2003/0110226 | A1 | 6/2003 | Inoue et al. | |
| 2003/0135575 | A1 * | 7/2003 | Marejka et al. | 709/207 |
| 2004/0150673 | A1 | 8/2004 | Dobronsky | |
| 2006/0168185 | A1 * | 7/2006 | McCall et al. | 709/223 |
| 2006/0168346 | A1 * | 7/2006 | Chen et al. | 709/246 |
| 2007/0112919 | A1 * | 5/2007 | Lyle et al. | 709/206 |

FOREIGN PATENT DOCUMENTS

AU 200051739 A * 12/2000
JP 2001043092 A * 2/2001

* cited by examiner

*Primary Examiner*—Firmin Backer
*Assistant Examiner*—Arvin Eskandarnia
(74) *Attorney, Agent, or Firm*—Ayla Lari; Hoffman Warnick LLC

(57) ABSTRACT

The present invention provides a self-updating email message. A method in accordance with an embodiment of the present invention includes: sending an email message to a recipient, the email message including encapsulated content; and selectively updating the email message in accordance with the encapsulated content when the email message is opened by the recipient.

18 Claims, 6 Drawing Sheets

SELF-UPDATING EMAIL MESSAGE

BACKGROUND OF THE INVENTION

1. Field of the Invention

The present invention generally relates to electronic mail (email), and more specifically relates to a self-updating email message.

2. Related Art

An email message often includes textual and/or graphical content that is used to entice a recipient of the email message to respond. An example of such an email message 10 is depicted in FIG. 1. As shown, the email message 10 comprises an advertisement for a company (e.g., Ruthie's Running Warehouse) and includes content such as images 12 and text 14. Unfortunately, there is no mechanism available for updating the content of the email message 10 after it has been received, especially when the recipient is off-line. The updating of the content of an email message could help capture the attention of a recipient, thereby increasing the chances that the recipient will respond to the email message or, at the very least, remind the recipient to respond to the email message.

SUMMARY OF THE INVENTION

The present invention provides an email message that can update itself (e.g., periodically) after it has been received, even when the recipient of the email message is off-line.

A first aspect of the present invention is directed to a method for providing a self-updating email message, comprising: sending an email message to a recipient, the email message including encapsulated content; and selectively updating the email message in accordance with the encapsulated content when the email message is opened by the recipient.

A second aspect of the present invention is directed to a method for providing a self-updating email message, comprising: receiving an email message including encapsulated content; and selectively updating the email message in accordance with the encapsulated content when the email message is opened by a recipient.

A third aspect of the present invention is directed to a system for providing a self-updating email message, comprising: a system for sending an email message to a recipient, the email message including encapsulated content; and a system for selectively updating the email message in accordance with the encapsulated content when the email message is opened by the recipient.

A fourth aspect of the present invention is directed to a program product stored on a computer readable medium for providing a self-updating email message, the computer readable medium comprising program code for performing the steps of: sending an email message to a recipient, the email message including encapsulated content; and selectively updating the email message in accordance with the encapsulated content when the email message is opened by the recipient.

A fifth aspect of the present invention is directed to a method for deploying an application for providing a self-updating email message, comprising: providing a computer infrastructure being operable to: send an email message to a recipient, the email message including encapsulated content; and selectively update the email message in accordance with the encapsulated content when the email message is opened by the recipient.

A sixth aspect of the present invention is directed to computer software embodied in a propagated signal for providing a self-updating email message, the computer software comprising instructions to cause a computer system to perform the functions of: sending an email message to a recipient, the email message including encapsulated content; and selectively updating the email message in accordance with the encapsulated content when the email message is opened by the recipient.

The illustrative aspects of the present invention are designed to solve the problems herein described and other problems not discussed, which are discoverable by a skilled artisan.

BRIEF DESCRIPTION OF THE DRAWINGS

These and other features of this invention will be more readily understood from the following detailed description of the various aspects of the invention taken in conjunction with the accompanying drawings in which.

Figure 1:
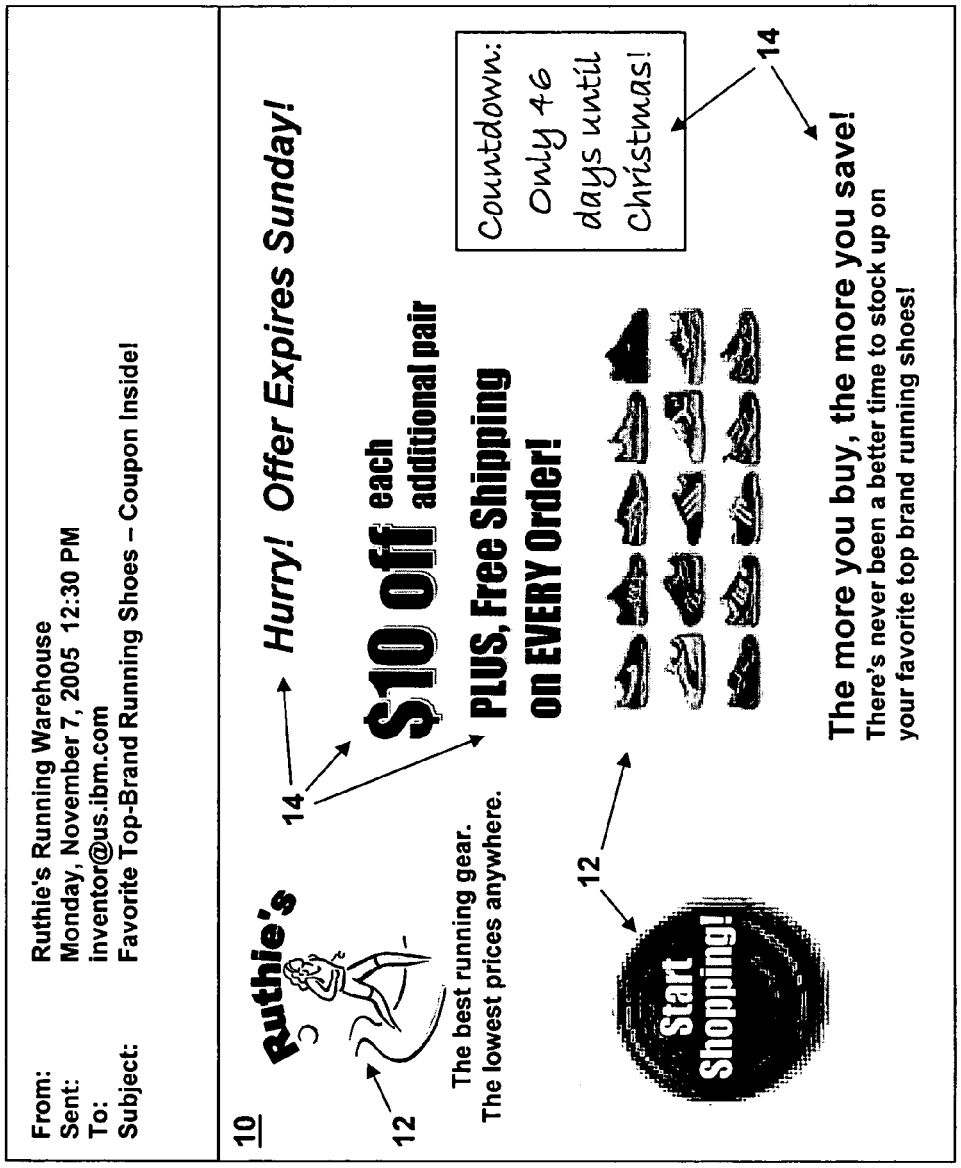
FIG. 1 depicts an illustrative email message in accordance with the prior art.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Figure 2:
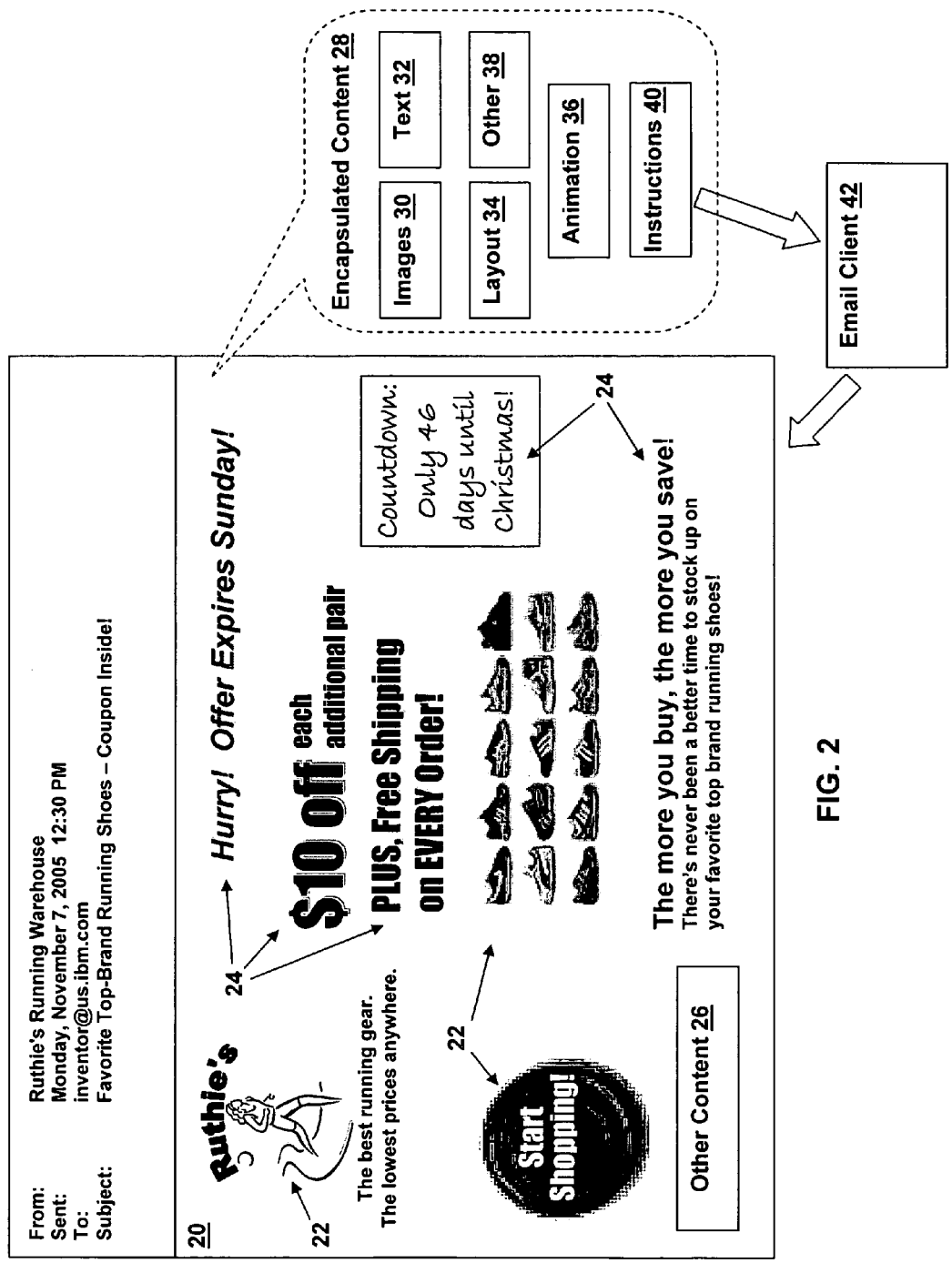
FIG. 2 depicts an illustrative self-updating email message in accordance with an embodiment of the present invention.

A self-updating email message 20 in accordance with an embodiment of the present invention is illustrated in FIG. 2. In addition to the images 22, text 24, and other content 26 displayed when initially read by a recipient, the email message 20 includes additional, encapsulated content 28. The encapsulated content 28 can include, for example, images 30, text 32, layout information 34 (e.g., colors, fonts, backgrounds, themes, etc.), animation 36, and/or other content 38 (e.g., audio, multimedia, website information, etc.). Provided with (or as part of) the encapsulated content 28 are instructions 40 (e.g., timing instructions) to the recipient's email client 42 regarding how and when the encapsulated content 28 is to be displayed to the recipient in the email message 20. As will be described in greater detail below, a sender of the email message 20 can selectively include the encapsulated content 28 and corresponding instructions 40 when composing the email message 20.

When the email message 20 is first read by a recipient, the email message 20 appears as shown in FIG. 2, with the encapsulated content 28 hidden from view. If the recipient keeps the email message 20 and views the email message 20 at a later time, the recipient will see an updated email message 20', which has been updated in accordance with the specifications of the sender via the encapsulated content 28. For example, suppose the email message 20 depicted in FIG. 2 was initially opened by a recipient on a Monday. If the recipient views the email message 20 again on Wednesday, whether on-line or not, the recipient is presented with an updated email message 20' such as that shown in FIG. 3.

Figure 3:
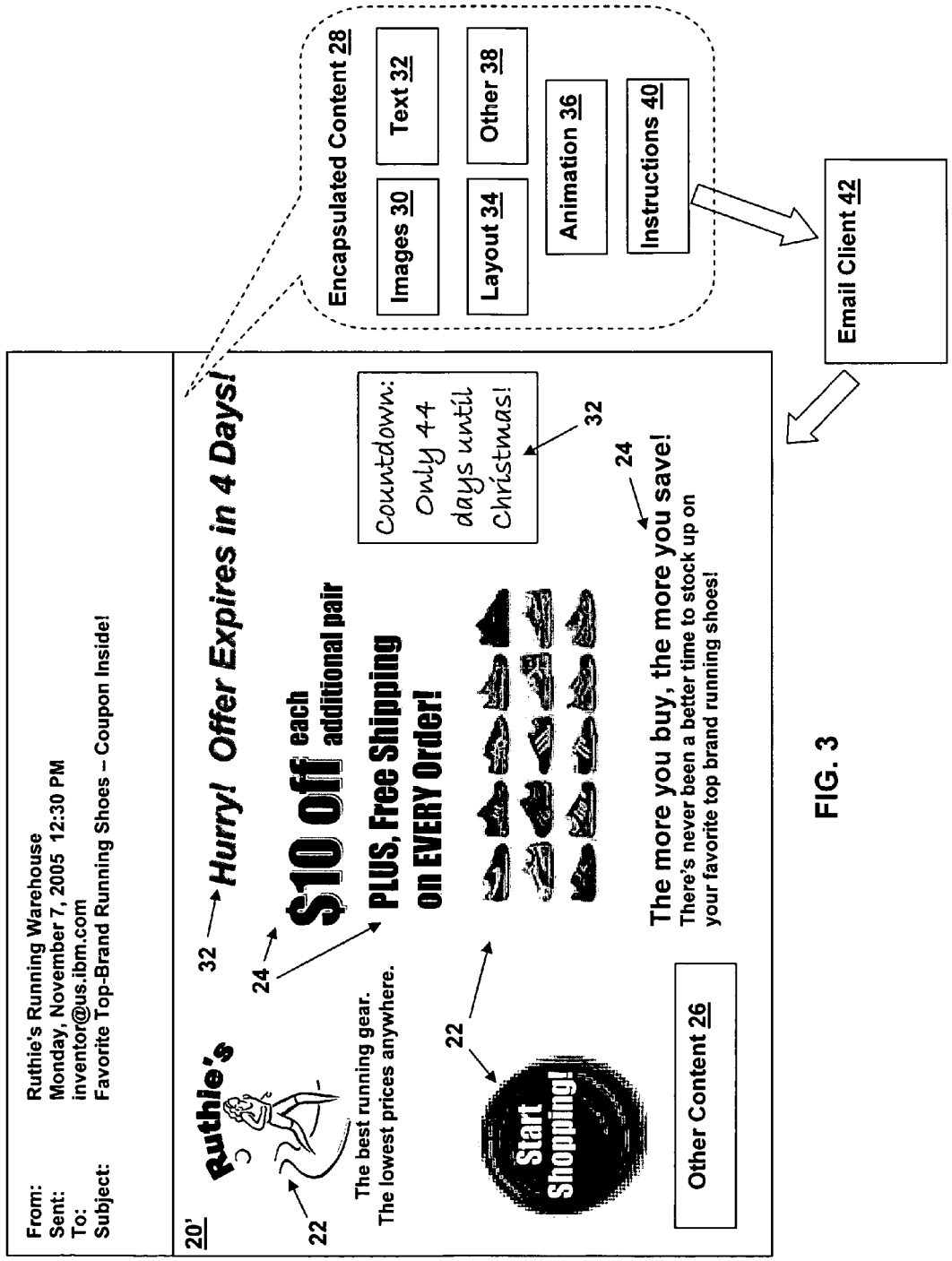
FIGS. 3-4 depict the self-updating email message of FIG. 2 at later points in time.

Comparing FIGS. 2 and 3, it can be seen that the text 24 "Hurry! Offer expires Sunday" in the email message 20 of FIG. 2 has been replaced with the text 32 "Hurry! Offer Expires in 4 days!" The text 32 "Hurry! Offer Expires in 4 days!" displayed in FIG. 3 is displayed in the same font as that used in the email message 20 of FIG. 2, but using a larger font size, and in a different color (e.g., using a "redder" color indicating the immediacy of the offer's expiration). It can also be seen that the text 24 "Countdown: Only 46 days until Christmas!" in the email message 20 of FIG. 2 has been replaced with the text 32 "Countdown: Only 44 days until Christmas!."

Figure 4:
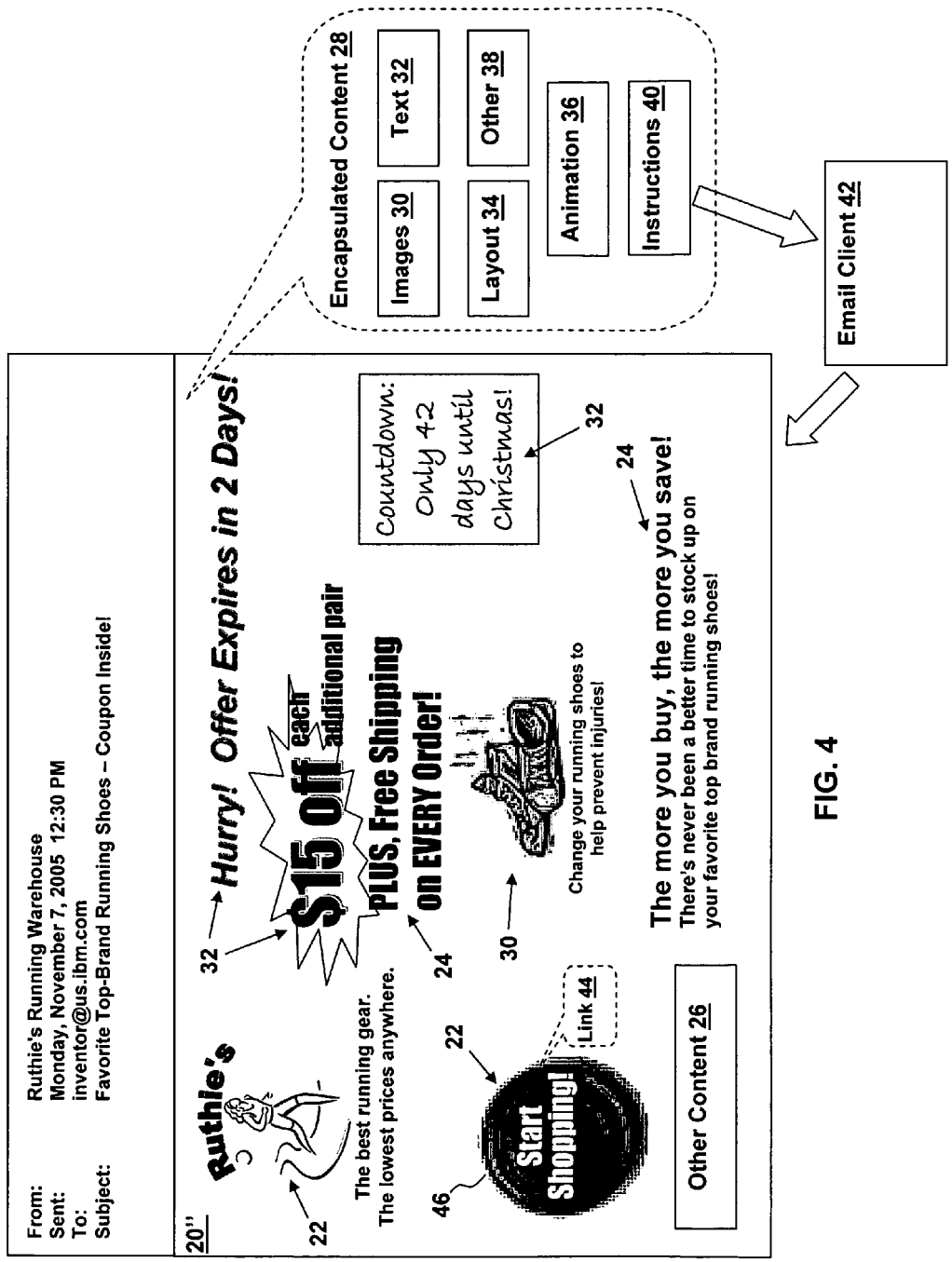

If the recipient views the email message 20 again on Friday, whether on-line or not, the recipient is presented with another updated email message 20", such as that shown in FIG. 4. Comparing FIGS. 3 and 4, it can be seen that the text 24 "Hurry! Offer expires in 4 days!" in the email message 20' of FIG. 3 has been replaced with the text 32 "Hurry! Offer Expires in 2 days!" Further, the text 32 "Countdown: Only 44 days until Christmas!," has been replaced with the text 32 "Countdown: Only 42 days until Christmas!" In addition, the text 24 "$10.00 off" has been replaced by the blinking/animated text 32 "$15.00 off," which flashes on and off repeatedly in order to catch the attention of the recipient.

Comparing FIGS. 3 and 4 further, it can be seen that the image 22 in FIG. 3 of a plurality of running shoes has been replaced with an image 30 of a worn out pair of running shoes having the caption "Change your shoes to help prevent running injuries." A link 44 (shown in phantom) to the website of Ruthie's Running Warehouse in the button 46 labeled "Start Shopping" has also been updated to include information (e.g., time information) that allows the website to monitor which link was accessed and when (e.g., how long after initial receipt of the email message 20) in order to get to the website. This information can be used, for example, for marketing analysis purposes.

Although the updating of content in an email message is described above as being one-to-one, that is, text is used to replace text, images are used to replace images, etc., this is not required. For example, a block of text can be replaced by an image, or vice versa. In general, in accordance with the present invention, an email message can be updated by replacing any type of content with any other type of content. Further, an email message can be updated by removing content without replacing it with other content, and/or by inserting new content into the email message (e.g., into a blank area of the email message). Many other variations are possible.

It should be noted that some content (e.g., an image 30, text 32, etc.) in the email message 20 (or in an updated version) can include a link that will direct the recipient's web browser to a particular website (e.g., www.RuthiesWarehouse.com) when actuated by the recipient. In accordance with the present invention, information displayed on or associated with the website can be included in the encapsulated content 28. When the recipient actuates the link in the email message 20, the corresponding information included in the encapsulated content 28 is displayed by recipient's web browser. In this way, the recipient can obtain information from a link in the email message 20 (or in an updated version) without having to be on-line.

Figure 5:
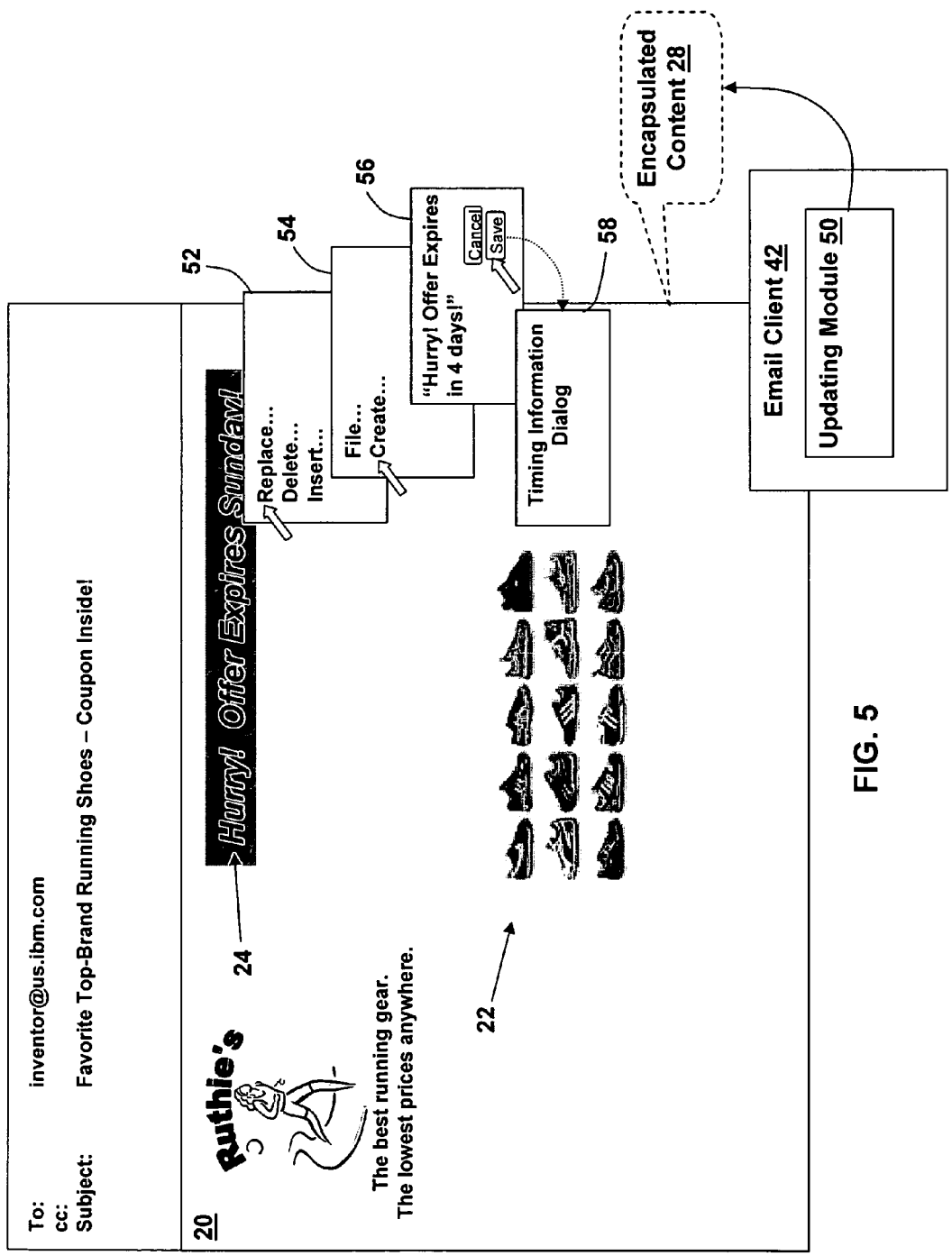
FIG. 5 depicts the composing of an illustrative self-updating email message in accordance with an embodiment of the present invention.

As depicted in FIG. 5, the email client 42 includes an updating module 50 for composing self-updating email messages and for updating received self-updating email messages. For example, assume in FIG. 5 that a user composing the email message 20 wishes to replace the text 24 "Hurry! Offer expires Sunday" with the text "Hurry! Offer Expires in 4 days!" Further, assume that the user composing the email message 20 desires that this update is to occur if a recipient reads the email message again, or for the first time, at a selected point in time (e.g., two days) after the email message 20 is originally sent. The user selects the text 24 "Hurry! Offer expires Sunday" and activates the updating module 50. This can be done, for example, by "right-clicking" on the selected text to reveal a dropdown list 52 and then selecting the command "Replace . . . " from the dropdown list 52. In response, another dropdown list 54 appears which allows the user to either select a file containing the replacement text or create the replacement text (e.g., in a pop-up window 56). Once the replacement text "Hurry! Offer Expires in 4 days!" has been provided by the user, the user will be prompted, for example, in a dialog window 58, to provide the timing information for the replacement text, which specifies the conditions (when, how, etc.) under which the replacement text is to be displayed. The replacement text and associated time information is then added by the updating module 50 to the encapsulated content 28, which is included with the email message 20 when it is sent to a recipient by the email client 42.

When an email message 20 having encapsulated content 28 is received by the email client 42 and is opened for the first time by a user, the email message 20 is displayed as originally composed by the sender. If the email message 20 is opened again by the user, the updating module 50 determines, based on the instructions 40 in the encapsulated content 28, whether the email message 20 is to be updated at that time. If the updating module 50 determines that the email message 20 is not to be updated, the email message 20 is displayed unchanged. If, however, the updating module 50 determines that the email message 20 is to be updated, then the updating module 50 updates the email message 20 in accordance with the instructions 40 using content included in the encapsulated content 28. The updated email message (e.g., email message 20', FIG. 3) is then displayed to the user by the email client 42. This process is repeated each time the email message 20 is subsequently opened by the user.

When composing the email message 20, a user can selectively control the conditions under which the email message 20 is to be updated. For example, the user can disable the updating if someone other than the intended recipient opens the email message 20. This situation may occur, for example, if the intended recipient forwards the email message 20 to another party. Further, the user can make a subset of the updates available if someone other than the intended recipient opens the email message 20. Such control information can be included in the instructions 40. Other control scenarios are also possible.

In another embodiment of the present invention, when an email message 20 having encapsulated content 28 is received by the email client 42 and is opened for the first time by a user, the updating module 50 determines, based on the instructions 40 in the encapsulated content 28, whether the email message 20 is to be updated at that time. If the updating module 50 determines that the email message 20 is not to be updated, the email message 20 is displayed as originally composed. If, however, the updating module 50 determines that the email message 20 is to be updated, then the updating module 50 updates the email message 20 in accordance with the instructions 40 using content included in the encapsulated content 28. The updated email message is then displayed to the user by the email client 42. Thus, if an email message 20 remains unread in the recipient's inbox, it can be selectively updated based on the encapsulated content 28 when initially opened by the recipient. For example, if the email message 20 (FIG. 2) is initially sent on a Monday, but is not read until Wednesday, the email message 20 will be updated to the email message 20' when initially opened by the recipient, and will appear as shown in FIG. 3. This embodiment can be combined with the embodiment detailed above such that the selective updating of an email message can occur any time an email message is opened.

Figure 6:
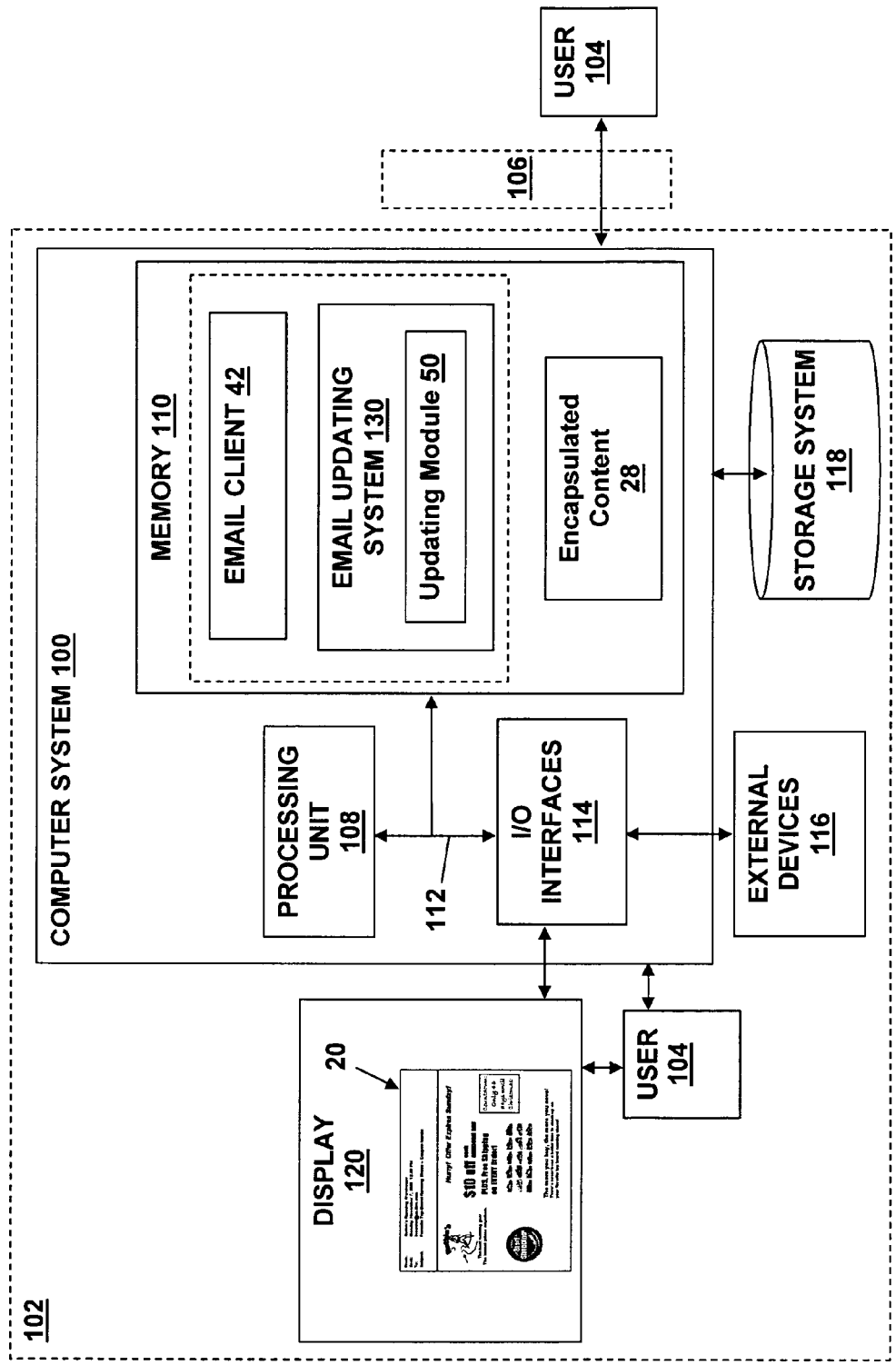
FIG. 6 depicts an illustrative computer system for implementing embodiment(s) of the present invention.

A computer system 100 for providing self-updating email messages in accordance with an embodiment of the present invention is depicted in FIG. 6. Computer system 100 is provided in a computer infrastructure 102. Computer system 100 is intended to represent any type of computer system capable of carrying out the teachings of the present invention.

For example, computer system 100 can be a laptop computer, a desktop computer, a workstation, a handheld device, a server, a cluster of computers, etc. In addition, as will be further described below, computer system 100 can be deployed and/or operated by a service provider that provides self-updating email messages in accordance with the present invention. It should be appreciated that a user 104 can access computer system 100 directly, or can operate a computer system that communicates with computer system 100 over a network 106 (e.g., the Internet, a wide area network (WAN), a local area network (LAN), a virtual private network (VPN), etc). In the case of the latter, communications between computer system 100 and a user-operated computer system can occur via any combination of various types of communications links. For example, the communication links can comprise addressable connections that can utilize any combination of wired and/or wireless transmission methods. Where communications occur via the Internet, connectivity can be provided by conventional TCP/IP sockets-based protocol, and an Internet service provider can be used to establish connectivity to the Internet.

Computer system 100 is shown including a processing unit 108, a memory 110, a bus 112, and input/output (I/O) interfaces 114. Further, computer system 100 is shown in communication with external devices/resources 116 and one or more storage systems 118. In general, processing unit 108 executes computer program code, such as email updating system 130, that is stored in memory 110 and/or storage system(s) 118. While executing computer program code, processing unit 108 can read and/or write data, to/from memory 110, storage system(s) 118, and/or I/O interfaces 114. Bus 112 provides a communication link between each of the components in computer system 100. External devices/resources 116 can comprise any devices (e.g., keyboard, pointing device, display (e.g., display 120, printer, etc.) that enable a user to interact with computer system 100 and/or any devices (e.g., network card, modem, etc.) that enable computer system 100 to communicate with one or more other computing devices.

Computer infrastructure 102 is only illustrative of various types of computer infrastructures that can be used to implement the present invention. For example, in one embodiment, computer infrastructure 102 can comprise two or more computing devices (e.g., a server cluster) that communicate over a network (e.g., network 106) to perform the various process steps of the invention. Moreover, computer system 100 is only representative of the many types of computer systems that can be used in the practice of the present invention, each of which can include numerous combinations of hardware/software. For example, processing unit 108 can comprise a single processing unit, or can be distributed across one or more processing units in one or more locations, e.g., on a client and server. Similarly, memory 110 and/or storage system(s) 118 can comprise any combination of various types of data storage and/or transmission media that reside at one or more physical locations. Further, I/O interfaces 114 can comprise any system for exchanging information with one or more external devices/resources 116. Still further, it is understood that one or more additional components (e.g., system software, communication systems, cache memory, etc.) not shown in FIG. 6 can be included in computer system 100. However, if computer system 100 comprises a handheld device or the like, it is understood that one or more external devices/resources 116 (e.g., a display) and/or one or more storage system(s) 118 can be contained within computer system 100, and not externally as shown.

Storage system(s) 118 can be any type of system (e.g., a database) capable of providing storage for information under the present invention. To this extent, storage system(s) 118 can include one or more storage devices, such as a magnetic disk drive or an optical disk drive. In another embodiment, storage system(s) 118 can include data distributed across, for example, a local area network (LAN), wide area network (WAN) or a storage area network (SAN) (not shown). Moreover, although not shown, computer systems operated by user 104 can contain computerized components similar to those described above with regard to computer system 100.

Shown in memory 110 (e.g., as a computer program product) is an email client 42 for generating and displaying email messages. Also included in memory 110 is an email updating system 130 for composing and updating received self-updating email messages in accordance with embodiments of the present invention. Although shown separately in memory 110, the email updating system 130 will generally be included as part of the email client 42 as indicated in phantom.

The email updating system 130 includes an updating module 50 for generating the encapsulated content 28 included in/with a self-updating email message 20, as detailed above. The updating module 50 is also configured to selectively update a previously opened email message, when opened again at a later time, based on the content and instructions included in the encapsulated content 28. The updating can be performed regardless of the on-line status of the email client 42 (e.g., the updating can occur when the email client 42 is off-line).

The present invention can be offered as a business method on a subscription or fee basis. For example, one or more components of the present invention can be created, maintained, supported, and/or deployed by a service provider that offers the functions described herein for customers. That is, a service provider can be used to provide a service for providing self-updating email messages, as described above.

It should also be understood that the present invention can be realized in hardware, software, a propagated signal, or any combination thereof. Any kind of computer/server system(s)—or other apparatus adapted for carrying out the methods described herein—is suitable. A typical combination of hardware and software can include a general purpose computer system with a computer program that, when loaded and executed, carries out the respective methods described herein. Alternatively, a specific use computer, containing specialized hardware for carrying out one or more of the functional tasks of the invention, can be utilized. The present invention can also be embedded in a computer program product or a propagated signal, which comprises all the respective features enabling the implementation of the methods described herein, and which—when loaded in a computer system—is able to carry out these methods.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

The present invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device), or a propagation medium. Examples of a computer-readable medium include a semiconductor or solid state memory, magnetic tape, removable computer diskette, random access memory (RAM), read-only memory (ROM), rigid magnetic disk and optical disk. Current examples of optical disks include a compact disk-read only disk (CD-ROM), a compact disk-read/write disk (CD-R/W), and a digital versatile disk (DVD).

Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

What is claimed is:

1. A method for providing a self updating email message, comprising:
    sending an email message to a recipient via a network connection, the email message including encapsulated content, wherein the encapsulated content includes instructions for updating the email message;
    selectively updating the email message in accordance with the encapsulated content when the email message is opened by the recipient, wherein the updating occurs when the network connection is not currently established; and
    controlling the updating of the email message if the email message is sent by the recipient to another party, wherein the controlling includes allowing a subset of the updating to occur, and wherein the controlling is performed using the instructions for updating the email message.

2. The method of claim 1, wherein the instructions for updating the email message include timing information detailing when the email message is to be updated.

3. The method of claim 1, wherein the instructions for updating the email message include information detailing how the email is to be updated.

4. The method of claim 1, wherein the encapsulated content further includes content for updating the email message in accordance with the instructions.

5. The method of claim 4, wherein the content for updating the email message is selected from the group consisting of: images, text, layout information, animation, audio, multimedia, and website information.

6. A method for providing a self-updating email message, comprising:
    receiving an email message including encapsulated content via a network connection, wherein the encapsulated content includes instructions for updating the email message;
    selectively updating the email message in accordance with the encapsulated content when the email message is opened by a recipient, wherein the updating occurs when the network connection is not currently established; and
    controlling the updating of the email message if the email message is sent by the recipient to another party, wherein the controlling includes allowing a subset of the updating to occur, and wherein the controlling is performed using the instructions for updating the email message.

7. The method of claim 6, wherein the instructions for updating the email message include timing information detailing when the email message is to be updated.

8. The method of claim 6, wherein the instructions for updating the email message include information detailing how the email is to be updated.

9. The method of claim 6, wherein the encapsulated content farther includes content for updating the email message in accordance with the instructions.

10. The method of claim 9, wherein the content for updating the email message is selected from the group consisting of: images, text, layout information, animation, audio, multimedia, and website information.

11. The method of claim 6, further comprising:
    controlling the updating of the email message if the email message is sent by the recipient to another party.

12. The method of claim 11, wherein controlling the updating further comprises:
    preventing the updating of the email message; or
    allowing a subset of the updating to occur.

13. A system for providing a self-updating email message, comprising:
    at least one computer including:
        a system for sending an email message to a recipient via a network connection, the email message including encapsulated content, wherein the encapsulated content includes instructions for updating the email message;
        a system for selectively updating the email message in accordance with the encapsulated content when the email message is opened by the recipient, wherein the updating occurs when the network connection is not currently established; and
        a system for controlling the updating of the email message if the email message is sent by the recipient to another party, wherein the controlling includes allowing a subset of the updating to occur, and wherein the controlling is performed using the instructions for updating the email message.

14. The system of claim 13, wherein the instructions for updating the email message include timing information detailing when the email message is to be updated.

15. The system of claim 13, wherein the instructions for updating the email message include information detailing how the email is to be updated.

16. The method of claim 13, wherein the encapsulated content farther includes content for updating the email message in accordance with the instructions.

17. The system of claim 16, wherein the content for updating the email message is selected from the group consisting of: images, text, layout information, animation, audio, multimedia, and website information.

18. A program product stored on a computer readable medium for providing a self-updating email message, the computer readable medium comprising program code, which when executed by a computer, performs the steps of:
    sending an email message to a recipient via a network connection, the email message including encapsulated content, wherein the encapsulated content includes instructions for updating the email message;
    selectively updating the email message in accordance with the encapsulated content when the email message is opened by the recipient, wherein the updating may occur when the network connection is not currently established; and
    controlling the updating of the email message if the email message is sent by the recipient to another party, wherein the controlling includes allowing a subset of the updating to occur, and wherein the controlling is performed using the instructions for updating the email message.

* * * * *